Nov. 26, 1968     R. L. SHARP ETAL     3,413,537

CONSTANT CURRENT BATTERY CHARGER

Filed Jan. 21, 1965

Robert L. Sharp
Merrill E. Smith
O. Dale Embree,
              INVENTORS.

BY *Harry M. Saragovitz*
   *Edward J. Kelly*
   *Herbert Berl*
   *Alfred E. Smith*
            ATTORNEYS

3,413,537
CONSTANT CURRENT BATTERY CHARGER
Robert L. Sharp, 5850 Beaumont, El Paso, Tex. 79912; Merrill E. Smith, 255 Madrid, Apt. 8, Las Cruces, N. Mex. 88001; and Otis Dale Embree, P.O. Box 3, Mesilla Park, N. Mex. 88047
Filed Jan. 21, 1965, Ser. No. 427,193
1 Claim. (Cl. 320—27)

ABSTRACT OF THE DISCLOSURE

A constant-current battery charger that takes advantage of the fact that a transistor, in a common emitter configuration, maintains a substantially constant collector current despite variations of the collector-to-emitter voltage. The transistor is connected in series with the battery, and maintains a substantially constant current to the battery, despite variations in the battery voltage as it becomes charged.

---

The invention described herein may be manufactured and used by or for the Government for governmental purposes without the payment of any royalty thereon.

The instant invention relates to a constant current battery charger.

The requirement for a constant current battery charger was brought about by the beginning of extensive use of nickel-cadmium batteries to operate radio command control equipment for missile flight safety functions. These batteries were chosen because of their reliability, constant voltage under load, and ability to be charged and discharged many times.

In order to take advantage of the desirable characteristics of this type battery, the total energy stored in the battery must be known, or the ability to determine it must be possible.

The accepted way of rating battery capacity is to specify the terminal voltage and ampere-hour rating. The ampere-hour rating is the factor determining the amount of actual energy stored in the battery; the voltage does not determine the storage capacity but determines the rate at which the energy may be used from or replaced in the battery. The voltage of some batteries, the lead-acid type for example, varies with the amount of energy stored in the battery and may be used to indicate the state of charge or amount of energy stored. A standard method of testing such batteries is to load the battery with a known current and measure its terminal voltage. A person thus familiar with this type battery can determine from the voltage reading approximately how much charge the battery contains.

The nickel-cadmium battery however, maintains an almost constant terminal voltage until it is almost completely discharged, then the terminal voltage drops sharply. It is obvious then, that the standard load test will not indicate the state of charge of the nickel-cadmium battery except when totally discharged.

The ideal method of charging any battery is to continuously monitor the charging current so that the total energy input may be calculated. This would require a recording device or a person to monitor the current if the usual charging circuit were used in which the current gradually decreases as the battery is charged. If the battery charger is capable of maintaining a constant charging current, however, the battery may be left unattended for the required period of charging time.

Another advantage to using the constant current battery charger for sealed nickel-cadmium batteries is that if the charging current is greater than the maximum rated charging current, there is a danger that the battery will explode. If the constant current battery charger can be adjusted so that a range of current close to the maximum rating of the battery may be obtained, the charging current can be set exactly on the maximum rating, allowing the battery to be fully charged in the least possible time and without danger to the battery.

An object of the invention is to provide a relatively simple constant current battery charger.

Another object of the invention is to provide a constant-current battery charger wherein the current may be easily adjusted to a desired value, and which will accurately maintain such value.

The invention may be best understood by reference to the drawing in which.

Figure 1:
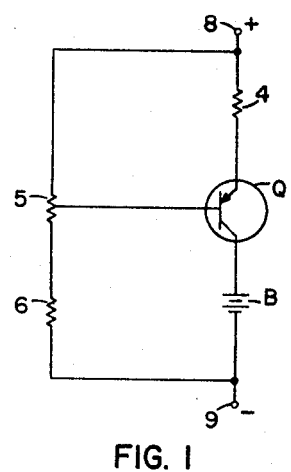
FIGURE 1 shows the basic circuit diagram of the invention.

The basic circuit in FIGURE 1 illustrates the method by which the constant current is obtained. Referring to the typical curves (FIGURE 2) of collector current versus collector voltage for a junction transistor in common emitter configuration, it can be seen that the collector current is almost constant for any value of collector to emitter voltage within a particular range of values. It can also be seen that for lower values of base current and corresponding collector current, the effect is more pronounced, such as the region $xy$ of the lowest curve of the family of curves of FIGURE 2.

Figure 2:
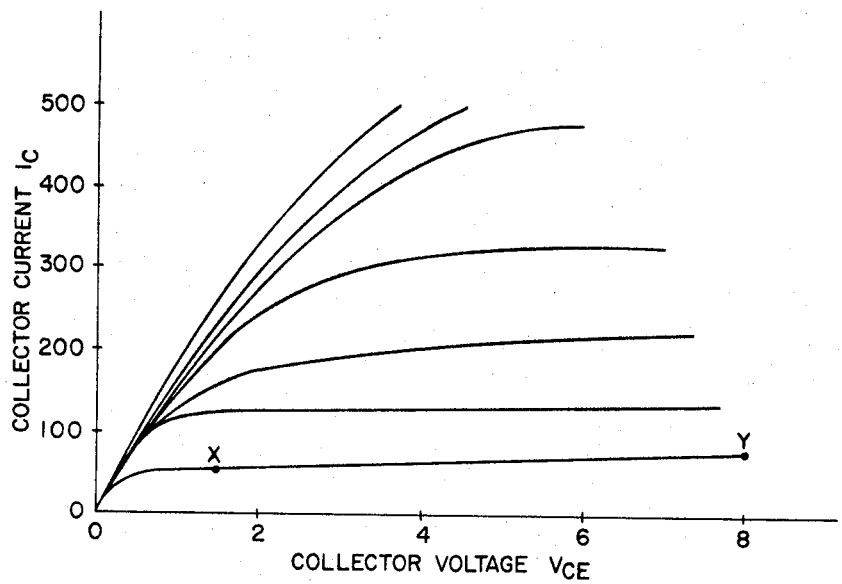
FIGURE 2 shows a family of characteristic curves of a typical junction transistor, in a common emitter circuit configuration.

In FIGURE 1, resistors 4, 5 and 6 form a stable biasing network so that the junction transistor Q is biased for a low value of collector current in the flatter region between $x$ and $y$, FIGURE 2, so that when a D.C. voltage is applied between terminals 8 and 9, the collector current to the transistor is near the desired charging current of the battery B. The battery may be considered as a resistance whose value changes as the battery charges. However, since the effect of changing resistance in the collector circuit merely tends to change the voltage between the collector and emitter of the transistor, it is obvious from the previous statements that the effect of the changing resistance of the battery will not change the value of the charging current.

Adjustment of the variable resistor 5 will permit the operator to precisely set the charging current of the battery to the desired value.

Figure 3:
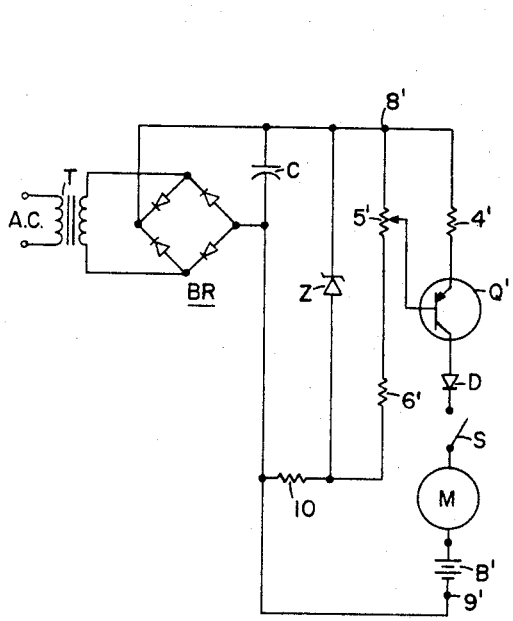
FIGURE 3 shows a specific embodiment of the invention.

The circuit of the specific embodiment as shown in FIGURE 3 shows a typical arrangement with refinements of the basic circuit which enhance the value of the basic circuit in partial use; however, the invention is not limited to this circuit alone, since other refinements for additional applications are readily apparent.

A power transistor Q' is preferably used in FIGURE 3, because it is possible to obtain the necessary collector current for the desired battery charging current, and yet operate the transistor in the more desirable region $xy$ in FIGURE 2. The transistor is provided with a heat sink (not shown) in the usual manner. The primary of the transformer T has 117 volt A.C. applied and steps down the voltage to the proper battery voltage. A full-wave bridge rectifier BR rectifies the secondary output of transformer T and capacitor C acts as a smoothing filter for the resulting D.C. voltage. The Zener diode Z, through resistor 10, acts as a voltage regulator, so that a constant D.C. voltage is maintained between terminals 8' and 9'. A switch S is provided so that the charging path may be interrupted as desired. A diode D in series with the battery B' prevents discharging of the battery in event of battery charger failure or accidental disruption or failure of the 117 volt A.C. input. Resistors 4', 5' and 6' correspond to resistors 4, 5 and 6 of FIGURE 1, and act as a voltage dividing bias source for the transistor Q'.

Operation of the circuit is as follows: an A.C. source is connected to the primary of transformer T, the output of the transformer secondary is rectified, smoothed, voltage regulated and applied between terminals 8' and 9'. The battery B' is assumed as already being in circuit as shown. The switch S is closed, the charging current is read on millimeter M, and the potentiometer 5' is adjusted until the proper charging current is observed on millimeter M.

Obviously, a timer (not shown) could be connected to the battery charger to stop the charging after a predetermined time. While a PNP type transistor has been specifically shown, an NPN type transistor could also obviously be used, with the proper changes in bias voltage, etc.

The invention herein described was specifically designed to produce the desired constant charging current characteristics. It will be apparent to persons skilled in the art that the basic circuit of FIGURE 1 and the circuit of the working model, FIGURE 3, could be applied to devices other than batteries where a constant current is desired.

We claim:
1. A constant current charger for a battery, including a Zener diode voltage-regulated D.C. source, a PNP type transistor having an emitter, a collector, and a base, the emitter being connected to the positive terminal of said source, a diode, the collector being connected through said diode to the positive terminal of said battery, the base of the transistor being connected to a voltage divider across the source, and the negative terminal of said battery being connected to the negative terminal of said source.

References Cited
UNITED STATES PATENTS

| | | | |
|---|---|---|---|
| 3,333,176 | 7/1967 | Cronin et al. | 320—39 |
| 3,123,759 | 3/1964 | Gray | 320—40 |
| 3,160,805 | 12/1964 | Lawson | 320—39 |
| 3,226,623 | 12/1965 | Krueger et al. | 320—43 |
| 3,114,872 | 12/1963 | Allard | 323—4 |
| 3,217,225 | 11/1965 | Gottlieb et al. | 320—37 |

LEE T. HIX, *Primary Examiner.*

S. WEINBERG, *Assistant Examiner.*